May 30, 1967
A. G. BODINE, JR  3,322,196
ELECTRO-ACOUSTIC TRANSDUCER AND PROCESS FOR USING SAME
FOR SECONDARY RECOVERY OF PETROLEUM FROM WELLS
Filed Nov. 5, 1963
2 Sheets—Sheet 2
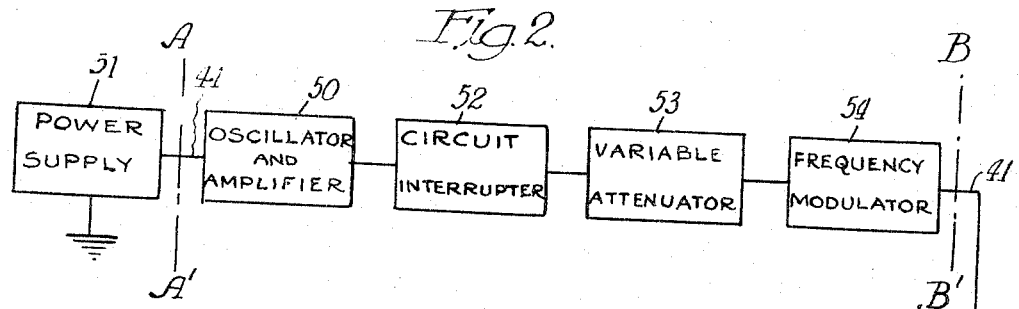
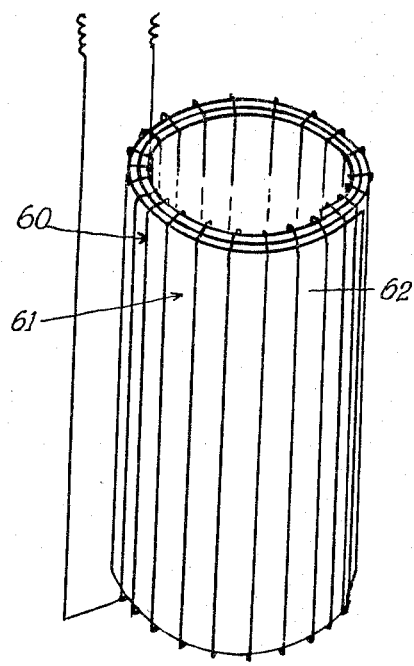
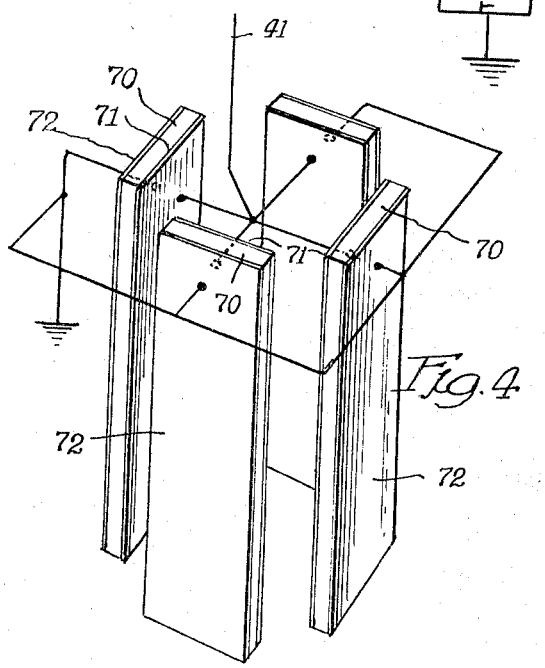
INVENTOR.
Albert G. Bodine, Jr.
BY
Forrest Kelly
Attorney

United States Patent Office 3,322,196
Patented May 30, 1967

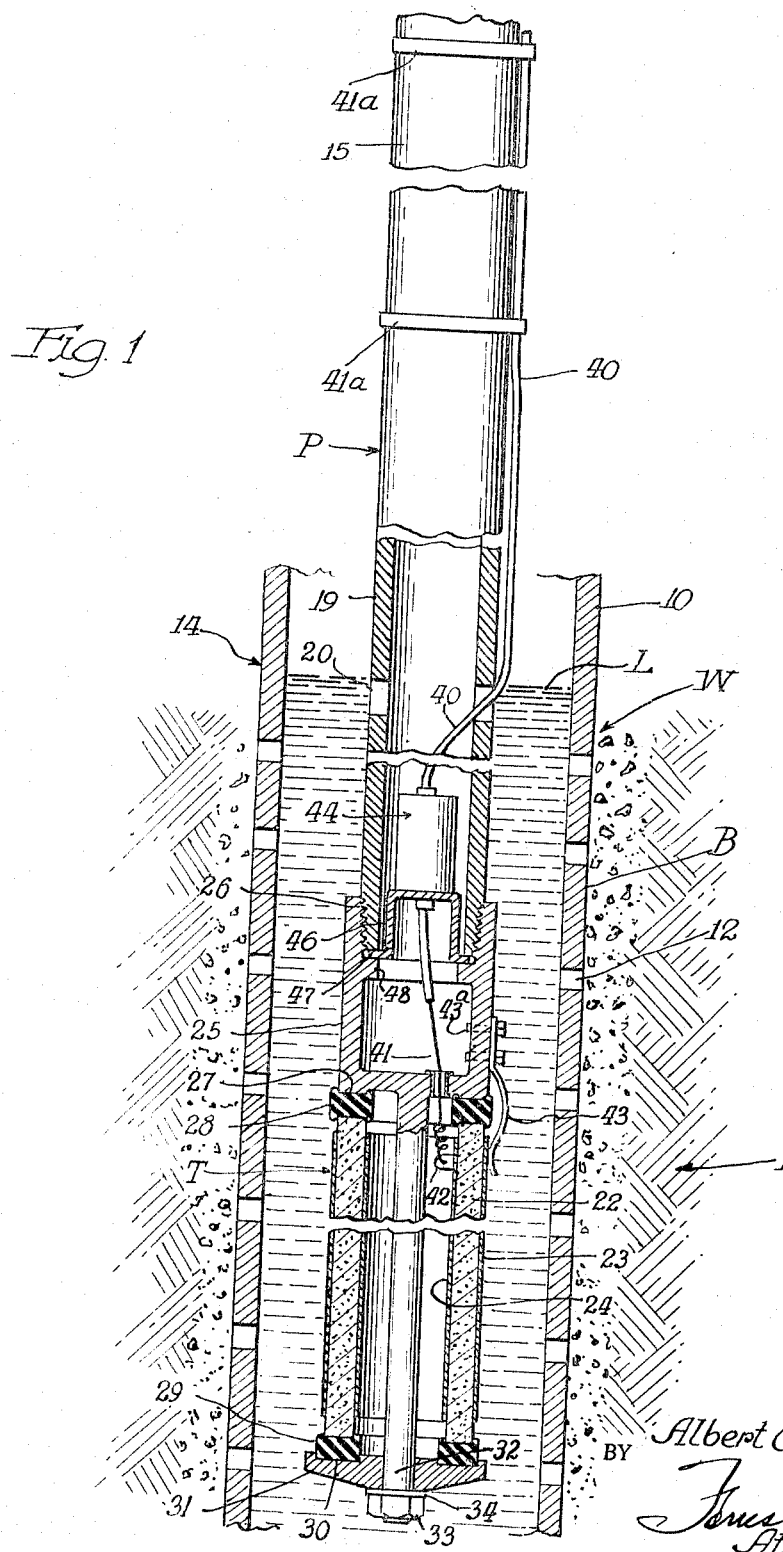

3,322,196
ELECTRO-ACOUSTIC TRANSDUCER AND PROCESS FOR USING SAME FOR SECONDARY RECOVERY OF PETROLEUM FROM WELLS
Albert G. Bodine, Jr., 7877 Woodley Ave.,
Van Nuys, Calif. 91406
Filed Nov. 5, 1963, Ser. No. 321,463
16 Claims. (Cl. 166—45)

This invention relates generally to so-called secondary recovery in petroleum wells through application to the formation of sonic wave energy. This subject was dealt with in my prior Patent Re. 23,381, June 26, 1951.

Extended discussions of secondary recovery by sonic wave application, including additional aspects and concepts, is contained in my improvement Patents Nos. 2,667,932, 2,680,485 and 2,700,422, and all of said prior patents are incorporated herein by this reference.

Suffice it to say here that sonic secondary recovery includes the concept of radiating sonic waves into the oil bearing formation surrounding a well, by which the formation is set into sonic vibration, yielding the highly useful result that flow of petroleum fluids from the formation to the well is materially promoted, with corresponding gain in production from the well.

This process is particularly useful with low producing, depleted or exhausted wells, which still, however, contain valuable petroleum in the formation.

The present invention deals particularly with improvements in the subject matter illustrated in FIG. 5 of my above-mentioned Patent Re. 23,381, including improvements in both the transducer and the process practiced with the use thereof.

The primary object of the invention is to increase materially the acoustic energy delivered from the transducer to the formation, particularly in depleted wells which tend to make acoustic coupling difficult.

A further object is to provide a powerful acoustic transducer whose wave radiation pattern has a large component of radial direction.

It is a further object of the invention to provide a system which maintains an assured hydrostatic head of well fluid over the transducer, to the end that large amounts of sonic energy can be radiated by the transducer without material or deleterious cavitation.

It is an object of the invention to provide conditions and a process according to which the transducer is operated at high energy level, such as when taken together with its large radiation surface, assures operation at a fairly low Q.

A further object is to provide, particularly in forms of the invention having low Q, for adjustment and/or modulation of the frequency of operation of the sonic transducer, so as to provide for the attainment of different frequency response effects in the formation.

The invention is primarily intended for application to producing oil wells, after the well has been drilled and completed, including installation of the casing and all normal production items of well construction. It may be practiced either continuously or from time to time during actual pumping from the well, or while the pump is temporarily shut down. The invention is applicable to wells having perforated casing, perforated liners, even unperforated portions of casing, and "barefoot" wells which are completed in open rock. In all of these standard forms of wells it can be seen that the acoustic radiation can be transmitted from a fluid body within the well, out into the formation, through any perforations in the intervening casing. The invention, however, affords a sonic transducer construction which is so powerful and so advantageously configured and oriented that it will dependably radiate sound waves even through unperforated casing.

An important feature of the invention is a distribution or extension of the transducer, either in single or multiple units, along a relatively extended vertical interval of the casing, so as to have a large amount of radiation coupling surface. In this connection, it is a preferred and important feature and advantage of the invention that the sonic wave radiation surface of the transducer have a vertical dimension which is at least substantially as great as the diameter of the well.

A feature of the invention is to increase the peak energy density of the sonic wave radiations by applying oscillatory electrical energy to the transducer in a series of pulses, i.e., by periodic interruption of the oscillatory current fed to the transducer. In this manner a greater peak energy stress can be applied to the transducer down in the well without causing failure under the extreme environmental conditions such as temperature and others which are common in petroleum wells.

The invention will be better understood from the following detailed description of certain illustrative embodiments thereof, reference for this purpose being had to the accompanying drawings, in which:

FIG. 1 is a fragmentary vertical sectional view, with parts broken away, of one embodiment of the present invention;

FIG. 2 is a schematic electrical diagram illustrating a typical transducer energizing system in accordance with the invention;

FIG. 3 is a perspective view showing somewhat diagrammatically a modified transducer in accordance with the invention; and FIG. 4 is a view similar to FIG. 3 but showing another modified transducer in accordance with the invention.

In FIG. 1 is illustrated the lower end portion of an oil well W having a well bore B containing a pump P, of any desired type, installed therein. A usual casing 10 is installed in the bore of the oil well. The producing formation is designated at 11. Casing 10 is provided, in the region of this producing formation 11, with usual perforations 12. It will be understood that the upper portion of the oil well, and the ground surface equipment, may be conventional in nature, and need not be illustrated herein. The well contains a pump tubing string 15 which leads from pump P to the ground surface. FIG. 1 shows the pump at P, the tubing string at 15, and an inlet tubing 19 extending downwardly from pump P, it being understood that suitable couplings, not shown, are provided at the junctures of pump P with the tubing string 15 and inlet tubing 19. In flowing wells the arrangement is similar, except that a pump is not necessary. The ground surface equipment at the well head may be entirely conventional, including a delivery line for the well fluids reaching the top end of tubing 15, a head for casing 10, etc., as will be well understood by those skilled in the art. Also, as mentioned in the introductory portion of the specification, the well may be of the type illustrated, with a perforated casing opposite the formation, or may incorporate a perforated liner, or screen, or may be entirely open opposite the producing formation. Moreover, the presently described transducer, or transducer element, T suspended on the lower end of tubing 19 is usually opposite a perforated portion of the casing, but may in some instances be just above or just below a perforated portion of the casing, in which case the sonic waves radiated therefrom are capable of being transmitted through the casing to the oil producing region around the casing.

Referring again to FIG. 1, inlet tubing 19 has, above the perforated portion of the casing, well fluid inlet ports 20. The well fluids must stand at least to the level of these ports 20, as indicated at L in FIG. 1, and as will presently be seen, this liquid level L is spaced substantially above the level of the sonic wave transducer T.

According to the embodiment of FIG. 1, the transducer element T in accordance with the invention comprises a hollow vertically oriented cylinder 22, of an outside diameter of the order of one-half the interior diameter of the casing, and of a length which is at least substantially equal to the diameter of the well, in this instance, to the inside diameter of the casing 10. The cylinder 22 is shown with a break therein, and may be advantageously considerably longer than the interior diameter of the casing, e.g., it may be a number of feet in length. This cylinder 22 is composed of electro-striction material, such as barium titanate, which is a dielectric substance capable of changing its dimensions in response to an electric field, as known. This cylinder 22 is plated with electrically conductive layers 23 and 24 on its outer and inner surfaces, respectively, so as to provide electrodes, and thus form an electric capacitor.

A cylindrical transducer mounting body 25 is screw-threaded at its upper end, as indicated at 26, on to the lower extremity of pump tubing 15. The lower portion of this cylindrical body 25 is formed with an annular seat 27, of the same interior and exterior diameters as, and vertically opposed to, the upper end of the barium titanate cylinder 22, and a resilient gasket 28 is interposed between seat 27 and the upper end of cylinder 22. A similar resilient gasket 29 engages the lower end of cylinder 22 and is engaged at the bottom by an annular seating surface 30 on an annular clamp plate 31 which is centrally bored to receive a clamp rod 32 extending downwardly from body 25. The lower end of this rod 32 is screw-threaded, as indicated to receive a nut 33 which is set up tightly to press a washer 34 against the lower end of clamp plate 31. It will be clear that, by tightening up on nut 33, the barium titanate cylinder 22 is resiliently or yieldingly clamped vertically against the bottom of transducer body 25, and thus placed under a degree of longitudinal compression. The cylinder is thus under a certain endwise pressure or bias, though capable of a degree of circumferential and vertical elongation and contraction owing to the yieldability afforded in the resilient gaskets 28 and 29. Also, it will be seen that the installation is sealed so as to exclude well fluids from the interior of the cylinder.

Transducer T is fed electrically by means of an insulated electrical conductor 40 led downwardly along the pump tubing 15 from the ground surface and clipped to the tubing and to the pump as by means of clamp straps such as indicated at 41. The conductor 40 enters tubing 15 by way of one of the fluid inlet ports 20, and an electrical lead 41 fed thereby is connected by means of a suitable connector element 42 to the inner conductive layer 24 on the cylinder 22. The outer conductive layer 23 on cylinder 22 is contacted by a ground clip 43 fastened to body 25 as by fastening means 43a; and said fastening means 43a is available as an electrical ground for later described electrical components housed in the lower portion of tubing 19. Interposed in the circuit of conductor 40, and as here shown, located within the lower end portion of tubing 19 is an electrical pack or unit 44 which may include any one of several components to be later described; or, alternatively, these components may be situated at the ground surface, output thereof conducted downwardly along the pump tubing, as by a circuit conductor such as 40, but going directly to the transducer contact 42. The illustrated electrical unit 44 is shown as supported by an inverted cup 46 having an outwardly extended annular flange 47 seating on a step 48 formed within transducer body 25, and positioned by being engaged at the top by the lower end of tubing 19.

FIG. 2 shows schematically a circuit containing typical electrical components for feeding and controlling transducer T according to the invention. As is well known, a barium titanate electro-striction transducer is fed with an alternating or oscillating current of relatively high frequency, sometimes in excess of 1000 cycles per second. To produce this current requires an oscillator as a source of supply, followed by an amplifier for producing the necessary power. In FIG. 2, a combined oscillator and amplifier is designated generally at 50, and is shown provided with a conventional power supply unit 51. If desired, the oscillator and amplifier unit 50 may be located in the aforementioned electrical unit 44 placed in the tubing 19 just above transducer T, with the power supply located at the ground surface and the necessary electrical power conveyed to unit 44 by the conductor 40. The dashed line A-A' in FIG. 2 indicates that, for this case, the power supply is at the ground surface, and everything to the right of the line A-A', inclusive of the oscillator and amplifier, and the transducer T, is at the bottom of the well. This is the preferred practice.

According to the invention, the oscillatory current output of the amplifier is applied to transducer T in pulses or bursts, and for this purpose there is incorporated in the system of FIG. 2, immediately following the oscillator and amplifier, a circuit interrupter 52. This circuit interrupter 52 may be of any desired or conventional nature, and many examples of suitable devices for the intended purpose are known. The function of the circuit interrupter is to periodically close and open the circuit, with a pre-determined closed-circuit dwell time interval, and a pre-determined open circuit interval, so that the oscillatory electrical energy is applied in pulses or bursts. As stated, any suitable or known device for accomplishing this purpose can be used, and many such are familiar to the art.

Following circuit interrupter 52 is a variable attenuator unit 53, and the function of this device is to periodically or cyclically vary the voltage amplitude of the oscillatory current to the transducer. A variable gain control within the amplifier can be used for the same purpose, and is an equivalent. The attenuator may be variable by steps, or continuously, according to any cyclic functions, such as a sine function. It may, for example, include a series of taps closed in succession, as by a motor drive, and arranged to vary attenuation in a cyclic manner according to any desired periodic function. The varying energy level applied to the transducer thus affords periodic "rest" or "relaxation" periods during which stress is reduced, and the transducer permitted to recover, alternating with periods of maximum stress during which the transducer radiates at maximum amplitude, but which might not be safely sustained on a continuous basis.

Following the variable attenuator 53 is a frequency modulator 54, by which the frequency of the signal applied to the transducer may be periodically varied to obtain a variety of frequency responses from the formation. For this purpose, any frequency modulator known to the art and by which the frequency of the signal can be modulated throughout a substantial range may be employed. As regards the advantage of this component to the system, it is known that, owing to different impedance characteristics of different formations, some respond more actively to particular frequencies, and it is of advantage to fluctuate the frequency so as to reach or pass through the several frequencies at which the formation may best respond.

The signal resulting from these several wave-character-determining units is applied to the transducer, and causes vibration thereof in accordance with the characteristics of the applied wave.

When the barium titanate transducer element of FIG. 1 is energized by an oscillating electrical signal, it is subject to dimensional changes following the pulsations of the energizing signal, as well known. A barium titanate transducer in the form of a cylinder such as is provided in the present invention vibrates in the radial mode, i.e., alternately radially expands and contracts. In this vibration, the entire outside cylindrical surface alternately expands and contracts, all points on its surface moving in phase with all other points on its surface. The device functions in effect as an omni-range radiation source, sometimes known as a pulsating region. Such a transducer, radiation source or pulsating region provides good acoustic coupling to a surrounding medium, particularly to well fluids such as crude oil.

In operation, therefore, the transducer element T with its large, vertically oriented cylindrical surface, of relatively large area and of relatively large vertical extent (i.e., with a vertical extension preferably equal as a minimum to the diameter of the well, or even greater, up to a number of feet), acoustically couples exceedingly effectively with the well fluids in the annulus between the transducer and the perforated casing. With this good acoustic coupling, and with high energy drive, powerful acoustic waves are thereby radiated and transmitted radially, and therefore horizontally, through the casing, and through the well fluids in the perforations to the formation. The well fluids and formation have impedances which are sufficiently well matched to one another, with a wave system having large vertical wave front, that the acoustic waves so reaching the formation are transmitted into and propagated radially outward within the formation to a substantial distance. This sound wave propagation through the producing formation results in augmented migration of the well fluids through the formation to the well, as described more fully in my aforementioned prior patents. The sonic wave energy density accomplished by the present invention is unusually high because of various features of the present invention as described hereinabove, including, importantly, the extended or unusually large vertical dimension of the cylindric radiation surface of the transducer.

Attention is particularly drawn to the fact that the well liquids stand in the annulus between the casing and pump tubing at least to the level L determined by the inlet ports 20, establishing a considerable hydrostatic head at the level of the transducer T. This head may be a number of feet in overall height, it being noted that a portion of tubing 19 and of casing 10 has been broken away in FIG. 1 between the ports 20 and the parts of the apparatus below. In other words, the tubing 19 is preferably a few feet in length. The substantial hydrostatic head so obtained is important to the operation of the transducer, since a positive pressure at the interface between the well fluids and the external surface of the radially vibratory transducer cylinder tends to avoid deleterious cavitation, which would otherwise be a trouble source at the vibration amplitudes and frequencies characteristic of the transducer.

The incorporation of the circuit interrupter 52 (FIG. 2) is an important feature of the invention, enabling the energizing electric energy to be applied to the transducer in a series of interrupted pulses or bursts. As mentioned earlier, this permits application of greater peak energy and cyclic stress to the transducer without risking failure of the transducer under the temperature and other environmental conditions and problems existing in deep oil wells.

The variable attenuator 53 permits application of electrical energy to the transducer variably according to a selected periodic function. For example, during a single pulse or burst, as permitted by circuit interrupter 52, a number of signal current oscillations or alternations may take place, of progressively increasing and then decreasing amplitude. By this means, the transducer is thus subjected to periodically increasing and then decreasing stress cycles, and groups or bursts of such stress cycles may be separated from one another by pre-determined time intervals of "rest," as determined by the operation of interrupter 52. The transducer may thus be operated more safely and effectively, to higher peak amplitude and stress, than could otherwise be satisfactorily achieved. Higher amplitude sound waves may thereby be radiated, on a periodic basis, and transmitted to and propagated within the producing formation. It should be understood that the circuit interrupter and variable attenuator may be employed together, as described, or either may be employed alone with advantage, while in simple forms of the invention both these units may be omitted.

In some forms of the invention, particularly transducers of relatively low Q, and therefore capable of operation successfully throughout a range of frequencies, it is an advantage to fluctuate the frequency of the energizing signal current, and therefore of the transducer, by use of the frequency modulator 54 (FIG. 2). As explained hereinabove, the producing rock or formation has different or variable frequency responses, and use of a modulated or fluctuating frequency permits periodic sweeping of the frequencies through the values most advantageous to various regions of the particular rock or formation encountered in any given well.

It was mentioned in the foregoing that, if desired, the power supply unit 51 may be located at the ground surface, and the balance of the system, to the right of the line A–A′ in FIG. 2, may be located adjacent the transducer, with the unit or pack 44. In this arrangement the final stage of electrical power, i.e., the oscillator-amplifier, is thus in the well, in proximity to the transducer. Such arrangement is of considerable practical advantage in reducing the problems of line transmission impedances for the high frequencies typical of electro-acoustic transducer, which are sometimes in excess of 1000 cycles per second. On the other hand, by paying proper attention to transmission considerations, the various units to the left of the dashed line B–B′ in FIG. 2 may be located at the ground surface, with only the transducer T at the bottom of the well.

Reference is next directed to FIG. 3, showing a modified form of transducer element, wherein the barium titanate electro-striction type of transducer element is replaced by a toroid winding 60 about a cylindric core 61 which is made up of a strip or sheet 62 of magneto-strictive material, such as nickel alloy, rolled through a number of turns to form a cylinder. The toroidal winding of the coil, energized at high frequency by a system such as that of FIG. 2, produces a longitudinal magnetic flux through the magneto-strictive sheet or strip, so that it elongates and contracts longitudinally, i.e., around the circumference. Therefore, the circumference expands and contracts, which amounts to a periodic radial expansion and contraction, similar to that obtained with the barium titanate transducer of FIG. 1. Eddy currents are eliminated in the magneto-striction core, because the roll is like an open secondary of a transformer. It will be understood that the magneto-striction roll, with its toroid winding, makes up as a cylindrical core, which is assembled with a transducer body structure of the type shown in FIG. 1.

FIG. 4 shows diagrammatically still another form of electro-striction transducer core or element which can be assembled with a transducer body of the type used in FIG. 1, and which can be energized by a system such as represented by FIG. 2. Here, the cylindric electro-striction core of FIG. 1 is replaced by a plurality of individual electro-striction slabs or elements 70. In the diagrammatic showing of FIG. 4, there are four of such slabs, but in practice, more of such slabs will generally be used; and the more slabs used, the closer, of course, the assembly of slabs will approach the cylindrical core of FIG. 1. Slabs 70 are provided with inside and outside conductive layers 71 and 72, respectively, and these are connected in circuit as indicated.

The transducer cores or elements of FIG. 3 and 4 have the preferred substantial vertical extension, the same as discussed in connection with FIG. 1.

The invention has now been described by way of a specific disclosure of certain present preferred forms

I claim:

1. The method of increasing the production rate from oil producing formation in a production oil well in an oil field, which comprises:
    installing an electro-acoustic transducer element in said well in the region of the producing formation,
    orienting the major effective radiating surfaces of said transducer element substantially vertically so as to provide horizontal radiation,
    acoustically coupling said vertically oriented transducer in energy transmitting relationship with said formation,
    installing production tubing in said well so as to maintain the fluid level in said well above said transducer element,
    and operating said transducer element so as to radiate acoustic energy into surrounding well fluid which is acoustically coupled to the producing formation therearound.

2. The subject matter of claim 1, wherein the electro-acoustic transducer is installed for a vertical distance in the well which is substantially at least equal to the diameter of the well.

3. The method of claim 1, including installing at least a final stage of electrical power amplifier for the transducer in the well, in close proximity to said transducer.

4. The method of claim 1, including feeding an oscillatory energizing current to said transducer, and periodically interrupting said current.

5. The subject matter of claim 1, including feeding electrical oscillatory energy to said transducer, and cyclically varying the level of the electrical energy fed to the transducer.

6. The subject matter of claim 1, including feeding electrical oscillatory energy to said transducer in pulses.

7. The subject matter of claim 1, including feeding oscillatory electrical energy to said transducer and modulating the frequency of the oscillatory electrical energy fed to the transducer.

8. In oil well producing apparatus, the combination of:
    a deep well pump operable within a well bore in the region of the producing formation around the well,
    a pump tubing in said well bore extending upwardly from said pump; and
    an electro-acoustic transducer element suspended from said pump, said electro-acoustic transducer element having a horizontally vibratory, vertically extended major sonic wave radiating surface exposed to well fluids within the well bore and thereby acoustically coupled in energy transmitting relationship with said formation.

9. The subject matter of claim 8, wherein said wave radiating surface has a vertical dimension at least substantially of the order of half the diameter of the well.

10. In oil well producing apparatus, the combination of:
    a deep well pump operable within a well bore in the region of the producing formation around the well,
    a pump tubing in said well bore extending upwardly from said pump; and
    an electro-acoustic transducer element suspended from said pump, said transducer element embodying a vibratory radially expansive and contractive hollow cylinder having an external radiating surface exposed to well fluids and oriented with a major effective area of said radiating surface vertically disposed so as to provide a component of horizontal radiation.

11. In oil well producing apparatus, the combination of:
    a deep well pump operable within a well bore in the region of the producing formation around the well,
    a pump tubing in said well bore extending upwardly from said pump,
    an electro-acoustic transducer element suspended from said pump, said transducer element having a horizontally vibratory, vertically extended major sonic wave radiating surface exposed to well fluids within the well bore,
    means for feeding electrical oscillatory energy to said transducer element, and
    means for pulsing said oscillatory energy.

12. In oil well producing apparatus, the combination of:
    a deep well pump operable within a well bore in the region of the producing formation around the well,
    a pump tubing in said well bore extending upwardly from said pump,
    an electro-acoustic transducer element suspended from said pump,
    means for feeding electrical oscillatory energy to said transducer element, said transducer element having a horizontally vibratory, vertically extended major sonic wave radiating surface exposed to well fluids within the well bore, and
    switching means for periodically interrupting said oscillatory electrical energy.

13. In oil well producing apparatus, the combination of:
    a deep well pump operable within a well bore in the region of the producing formation around the well,
    a pump tubing in said well bore extending upwardly from said pump,
    and electro-acoustic transducer element suspended from said pump, said transducer element having a horizontally vibratory, vertically extended major sonic wave radiating surface exposed to well fluids within the well bore,
    means for feeding electrical oscillatory energy to said transducer element, and
    means for periodically varying the energy level of said electrical energy fed to said transducer element.

14. In oil well producing apparatus, the combination of:
    a deep well pump operable within a well bore in the region of the producing formation around the well,
    a pump tubing in said well bore extending upwardly from said pump,
    an electro-acoustic transducer element suspended from said pump, said transducer element having a horizontally vibratory, vertically extended major sonic wave radiating surface exposed to well fluids within the well bore,
    means for feeding electrical oscillatory energy to said transducer element, and
    means for frequency modulating the oscillatory electrical energy fed to said transducer element.

15. In oil well producing apparatus, the combination of:
    a deep well pump operable within a well bore in the region of the producing formation around the well,
    a pump tubing in said well bore extending upwardly from said pump,
    a production fluid inlet tubing for said pump extending downwardly from said pump, and
    an electro-acoustic transducer element oriented for major horizontal relation and suspended from said inlet tubing and exposed to well fluids in said well and thereby acoustically coupled in energy transmitting relationship with said formation,
    said production fluid inlet tubing having an inlet port therein a substantial distance above said transducer element, whereby to assure imposition of a substantial hydrostatic head of well fluids on said transducer element.

16. In apparatus for producing petroleum fluids from a deep well having a well bore extending through a producing formation, the combination of:
- a production tubing extending upwardly in the well bore from the region of the producing formation, and
- an electro-acoustic transducer element positioned in the well bore at the lower end of said tubing, said transducer element having a vertically elongated, horizontally vibratory major sonic wave radiating surface exposed to well fluids within the well bore and thereby acoustically coupled in energy transmitting relationship with said formation, said production tubing having a fluid inlet maintaining the fluid level in the well bore above said transducer element.

References Cited

UNITED STATES PATENTS

| | | | |
|---|---|---|---|
| Re. 23,381 | 6/1951 | Bodine | 166—43 |
| 2,200,476 | 5/1940 | Mounce | 181—0.5 |
| 2,251,817 | 8/1941 | Athy et al. | 181—0.5 |
| 2,275,736 | 3/1942 | Cloud | 181—0.5 |
| 2,530,971 | 11/1960 | Kean | 340—11 X |
| 2,670,801 | 3/1954 | Sherborne | 166—177 X |
| 2,700,422 | 1/1955 | Bodine | 166—9 |
| 2,705,460 | 4/1955 | Burdick | 340—11 X |
| 2,849,075 | 8/1958 | Godbey | 340—10 X |
| 2,975,846 | 3/1961 | Bodine | 175—19 |

CHARLES E. O'CONNELL, *Primary Examiner.*

D. H. BROWN, *Assistant Examiner.*